United States Patent
Cuomo et al.

[11] Patent Number: 5,819,640
[45] Date of Patent: Oct. 13, 1998

[54] CHAFER STRUCTURE AND ASSEMBLY FOR USE IN FOOD SERVICE

[76] Inventors: Thomas M. Cuomo, 148 Jefferson, Bloomingdale, Ill. 60108; Neal E. Katz, 840 Tanglewood Dr., Wheeling, Ill. 60090

[21] Appl. No.: 855,267

[22] Filed: May 13, 1997

[51] Int. Cl.⁶ .............. A47J 27/00; A47J 27/04; A47J 27/06; F24C 1/16
[52] U.S. Cl. ............. 99/483; 99/339; 99/449; 126/9 R; 126/37 R; 126/45; 126/261
[58] Field of Search ............. 99/339, 340, 341, 99/400, 401, 446, 448, 449, 483; 126/9 R, 9 A, 9 B, 37 R, 25 R, 261, 43, 45, 40, 39 B, 39 E, 377; 220/694, 428; 219/214, 217; 426/113, 407, 523; 431/298, 320, 325; D7/361, 364, 355, 356; D11/155

[56] References Cited

U.S. PATENT DOCUMENTS

| | | | |
|---|---|---|---|
| D. 192,900 | 5/1962 | Epstein | D7/364 |
| D. 275,643 | 9/1984 | Petteson | D7/355 |
| D. 305,972 | 2/1990 | Pearce | D7/366 |
| 1,701,989 | 2/1929 | Turner | 126/37 R |
| 3,361,126 | 1/1968 | Bloomfield | 126/261 |
| 4,832,295 | 5/1989 | Wagner | 126/215 X |
| 4,838,446 | 6/1989 | Ali | 220/694 |
| 4,899,722 | 2/1990 | Horewitch | 126/261 X |
| 4,920,873 | 5/1990 | Stevens | 99/339 |
| 5,012,791 | 5/1991 | McCabe | 126/43 |
| 5,045,672 | 9/1991 | Scott | 126/33 X |
| 5,119,800 | 6/1992 | Roberts et al. | 126/43 X |
| 5,211,157 | 5/1993 | Schwartz et al. | 431/255 X |
| 5,307,799 | 5/1994 | Scarnato et al. | 126/45 |
| 5,347,979 | 9/1994 | Haber | 126/43 |
| 5,355,869 | 10/1994 | Pickard et al. | 426/113 X |
| 5,467,697 | 11/1995 | Hunziker | 99/449 |
| 5,517,903 | 5/1996 | Kaufman | 99/449 |
| 5,567,146 | 10/1996 | Blankenship et al. | 431/320 |
| 5,584,283 | 12/1996 | Messina | 126/43 |
| 5,711,210 | 1/1998 | Kaufman | 99/340 |

*Primary Examiner*—Timothy F. Simone
*Attorney, Agent, or Firm*—Meroni & Meroni

[57] ABSTRACT

A fire retardant, portable chafer structure is disclosed. The chafer structure includes four sides and a bottom defining a generally rectangular-shaped structure having an interior chamber therewithin. The bottom is connected along a lower edge of each of the four sides to define a bottom tray adapted for holding and containing spilled material. A chafer rack is provided for placement in nested engagement within the chafer structure. One of the four sides has an aperture for providing access to the interior chamber by a user. Handles are provided on upper portions of the chafer structure.

20 Claims, 3 Drawing Sheets

5,819,640

CHAFER STRUCTURE AND ASSEMBLY FOR USE IN FOOD SERVICE

BACKGROUND OF THE INVENTION

1. Field of the Invention

The present invention relates generally to catering devices and equipment. More particularly, the invention pertains to a chafer structure and assembly for use in food service.

2. Description of the Prior Art

Chafers or chafing dishes are commonly used by restaurants and catering services for use in food service. A conventional chafer includes a rack or frame that contains a burner. A chafing dish tray is typically filled with water and is supported by the rack above the burner. Trays containing food are then placed into the chafing dish tray to be heated by the warmed water.

The burner produces a flame that is commonly generated by combusted petroleum based gel contained within a can, such as the fuel can manufactured under the trademark, STERNO. In outdoor environments, the open flame of the burner is susceptible to being extinguished by gusts of winds or drafts. Further, the use of open flames and fuel cans increases the likelihood of a fire occurring, where the combusting petroleum gel may be subject to spilling out upon a table or serving area. In use, for example, it is common that chafers having lit burners or heated fuel cans are moved or repositioned.

As will be described in greater detail hereinafter, the chafer structure and assembly of the present invention solves the aforementioned problems and employs a number of novel features that render it highly advantageous over the prior art.

SUMMARY OF THE INVENTION

Accordingly, it is an object of this invention to provide a chafer structure which shields a burner from being extinguished by gusts of wind or drafts.

Another object of this invention is to provide a chafer structure which is formed of fire retardant material and is able to contain fires or spills from fuel cans.

Still another object of this invention is to provide a chafer structure which is portable, stackable and can be manufactured inexpensively.

Yet another object of this invention is to provide a dual purpose chafer structure which can be used both in combination with a rack and burner for use in maintaining the heated temperature of food, or alternatively for use without a rack and burner to hold a chafer tray filled with ice.

To achieve the foregoing and other objectives, and in accordance with the purposes of the present invention a portable chafer structure is provided. The structure comprises a chafer base including four sides and a bottom defining a generally rectangular-shaped structure having an interior chamber therewithin. The bottom is connected with a lower edge of each of the four sides to define a bottom tray adapted for holding and containing material spilled thereupon. The chafer base is sized for holding a chafer rack within the interior chamber with sides of the chafer rack in immediate adjacency with corresponding sides of the four sides. The four sides of the chafer base extend vertically upwardly at a height at least the approximate height of the chafer rack. One of the four sides has an aperture sized to provide access to the interior chamber by a user.

In accordance with an aspect of the invention, the chafer base is formed of a fire retardant material. In one common application, the chafer rack holds a burner containing combustible material. Accordingly, should such combustible material spill out from the burner, the bottom tray would contain and hold such material.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
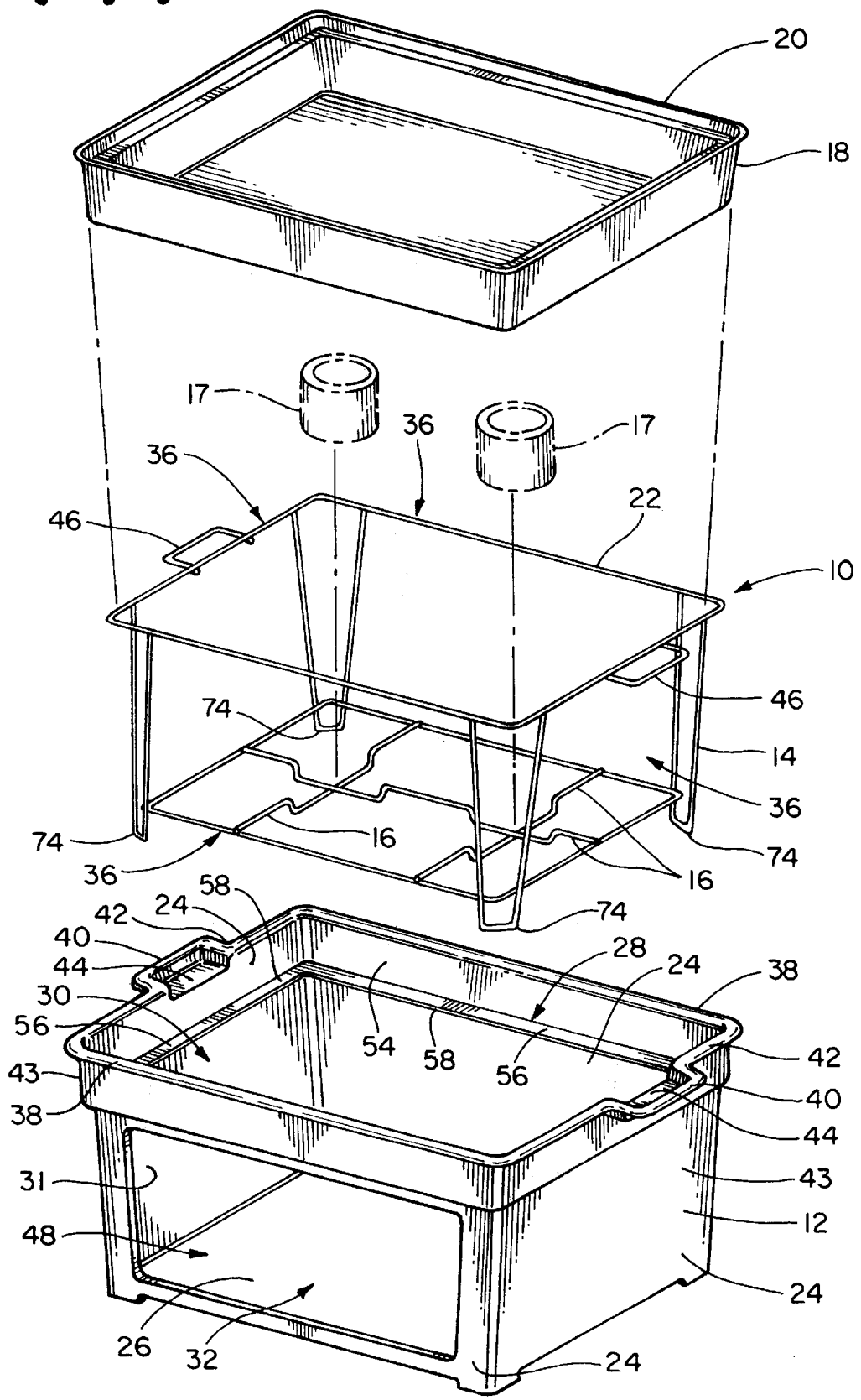
FIG. 1 is an exploded perspective view of the chafer assembly of the present invention.

Referring now to the drawings, a chafer or assembly 10 is illustrated in FIG. 1. The assembly 10 generally includes a chafer structure or base 12 and a metal wire frame or rack 14 engageable within the chafer structure 12. The rack 14 includes cross members 16 adapted to receive or hold burners 17 which are used to produce the heat necessary to warm a chafer dish tray or lower pan 18 having peripheral flanges 20 for supported engagement by upper edges 22 of the rack 14.

Preferably, the burners 17 are fuel cans which produce a flame that is commonly generated by combusted petroleum based gel contained within the can, such as the fuel can manufactured under the trademark, STERNO. The use STERNO and other similar types of fuel cans are commonly used by prior art chafers. Accordingly, the use of open flames and fuel cans increases the likelihood of a fire occurring, where the combusting petroleum gel may be subject to spilling out upon a table or serving area. The chafer structure 12 of the present invention, as hereafter described, solves the aforementioned problem to provide a portable, easy to use chafer which can be manufactured inexpensively and provides shielding from wind or drafts which can extinguish the flames.

Figure 2:
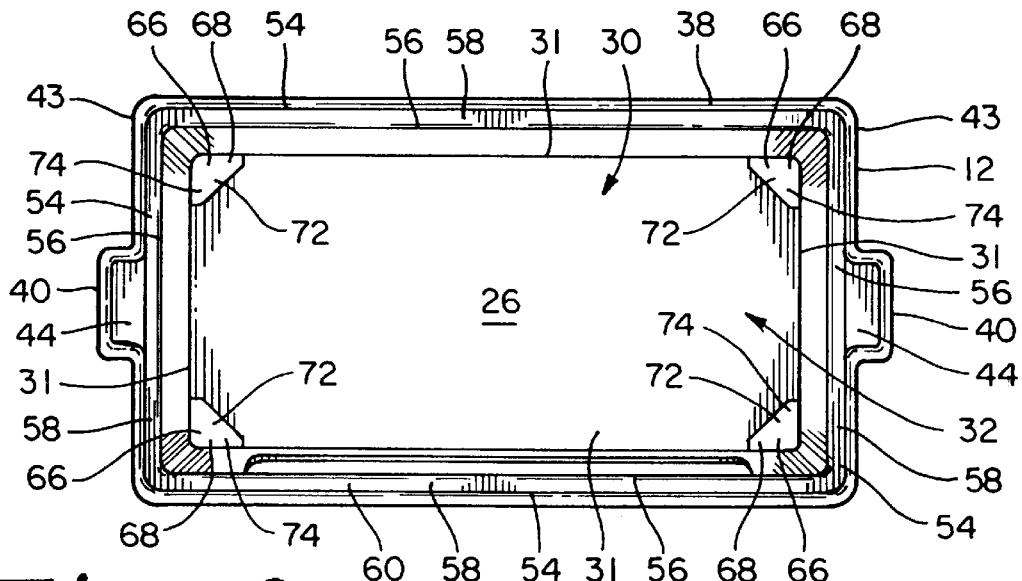
FIG. 2 is a top view of the chafer structure of the present invention.
Figure 3:
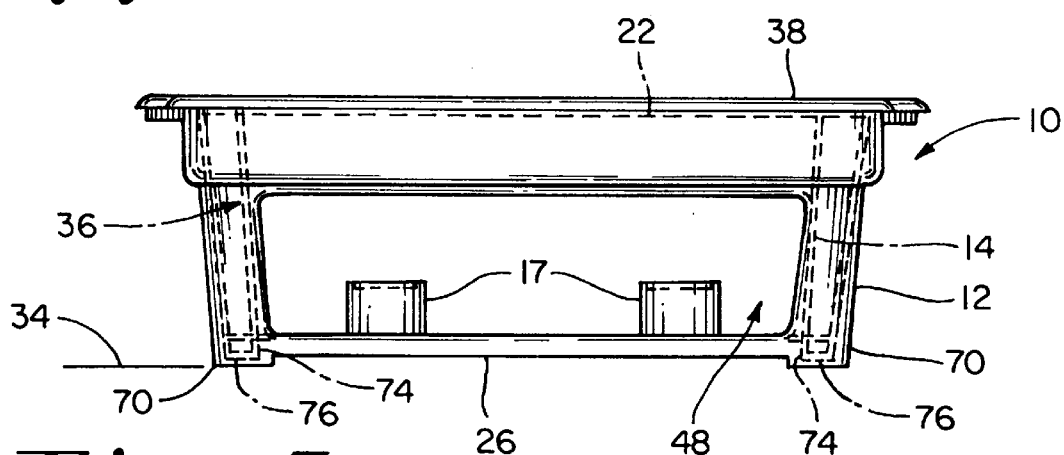
FIG. 3 is a rear side view of the chafer structure.

Referring to FIGS. 1–3, the chafer structure or base 12 includes four sides 24 and a horizontal bottom 26 defining a generally rectangular-shaped structure having an open top 28 and an interior chamber 30. The chafer base 12 is formed of a fire retardant material. Preferably, the base 12 is formed of a molded high impact fire retardant plastic which is durable and light weight. These features are also deemed significant where the chafer structure 12 must be transported from storage spaces, to catering kitchens or restaurants, and to vehicles or carts for transportation to a site for setup on a table. Where this process and its reverse occur repeatably during the life of chafer, it is therefore desirous to have a durable lightweight chafer that is easy to transport and store, as provided by the present invention.

The solid bottom 26 is connected along a lower edge or portion 31 of each of the four sides 24 to define a bottom tray 32 adapted for holding and containing material spilled thereupon. The bottom tray 32 thereby pools the spilled material within interior chamber 30 preventing the material spilled, such as combusting gel, to fall upon a table or surface 34 (FIG. 3) which could cause the table 34 or table cloth lying thereupon to become engulfed with flames.

The chafer rack 14 is insertable in nested engagement within the interior chamber 30 with sides 36 of the chafer rack 14 in immediate adjacency with corresponding sides of the four sides 24 of the chafer base 12. The four sides 24 of the chafer base 12 extend vertically upwardly with upper side edges 38 of the chafer base 12 adjacent with corresponding upper edges 22 of the chafer rack 14, where the sides 24 extend to a height at least the approximate height of the chafer rack 14. It should be noted that chafer racks already commercially available may be usable with the chafer base 12 of the present invention so that a user need only purchase the chafer base 12 as additional equipment.

Figure 5:
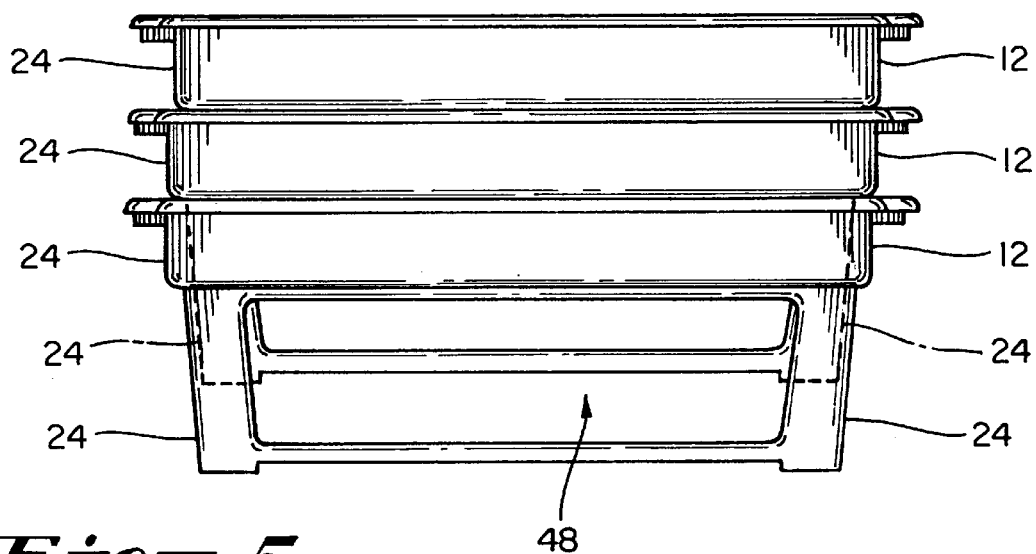
FIG. 5 is a side view of a plurality of chafer structures of similar construction in nested engagement with one another for transportation or storage.

Handles 40 are provided on upper portions 42 of opposite sides 43 of the chafer base 12 for allowing a user to carry the chafer base 12. In a preferred embodiment, the handles 40 have upper recessed portions 44 sized for receiving corresponding wire handles 46 of the rack 14. The four sides 24 are sloped downwardly inwardly allowing a plurality of chafer bases 12 of similar construction to be stackable in nested relationship with one another, as illustrated in FIG. 5.

Figure 4:
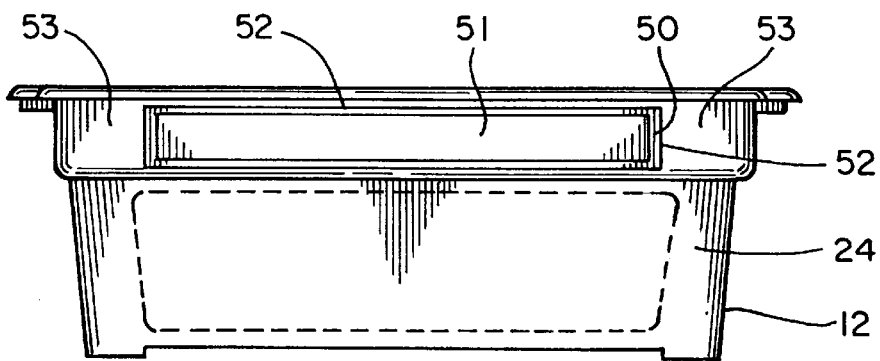
FIG. 4 is a front side view of the chafer structure.

One of the four sides 24 has an aperture 48 for providing access to the interior chamber 30 by a user. The aperture 48 also allows the ingress of air into the interior chamber 30 needed to maintain the combustion process of the burner 17. Another one of the four sides 24, preferably the side 24 opposite to the side 24 having the aperture 48, has an exterior surface portion 50 sized and adapted for securement with a label 51 containing indicia, as illustrated in FIG. 4.

The indicia could include, for example, the name of a catering service, restaurant, or alternatively a name plate indicating the type of food carried by that particular chafer 10. The exterior surface portion 50 may be defined by outer edges 52 which recess or project the portion 50 from the surrounding surface 53 to aid in directing visual attention to the label 51. Additionally, the chafer structure 12 may be molded in varied colors to correspond to a user's business trademark colors or for other color coding needs, as desired.

Referring to FIGS. 1 and 2, an interior side 54 of each of the four sides 24, or at least two opposing sides 24, has a ledge 56 extending horizontally across. Each ledge has an upwardly facing horizontal surface 58. The horizontal surfaces 58 of each of the ledges 56 lie within a common horizontal plane and form a generally rectangular-shaped perimeter 60 about the interior chamber 30. The perimeter 60 and each ledge 56 is in a spaced apart relationship below upper edges 38 of the chafer structure 12.

Referring to FIGS. 2 and 3, the bottom 26 has four corners 66. Each corner 66 has a downwardly extending portion 68 forming a foot 70 to support the chafer base 12 on a surface. An interior side 72 of each downwardly extending portion 68 has a recess 74 for receiving a leg 76 of the chafer rack 14.

Figure 6:
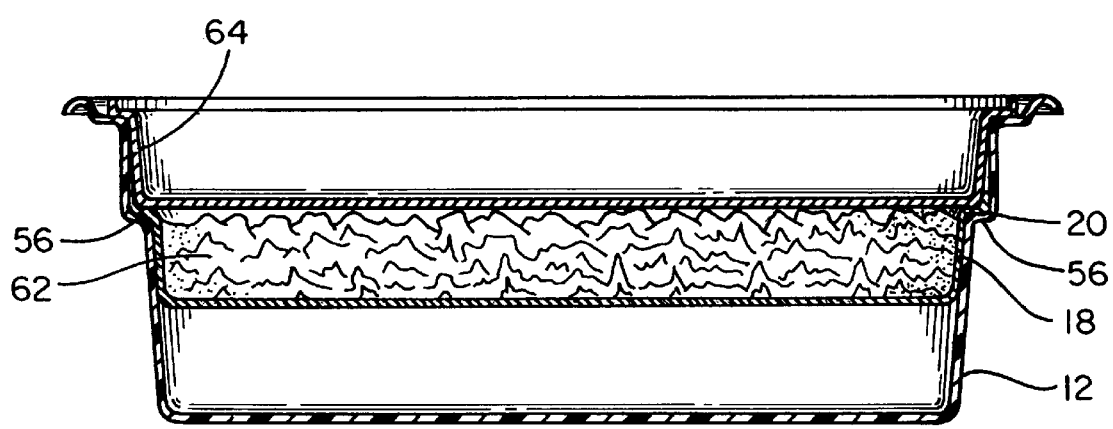
FIG. 6 is a sectional view of the chafer structure for use without a rack to support a chafer dish tray.

Accordingly, the chafer base or structure 12 has a dual function. The chafer rack 14 is selectably removable from the chafer base 12 allowing peripheral flanges 20 of the lower pan 18 to be in supported engagement with the ledges 56 to support the lower pan 18 within the chafer base 12, as illustrated in FIG. 6. Hence, the chafer 10 can be used both in combination with a rack 14 and burner 17 for use in maintaining the heated temperature of food contained in food trays nested into the lower pan 18, or alternatively for use without a rack 14 and burner 17 to hold a chafer tray or lower pan 18 filled with ice 62 (FIG. 6), where an upper pan or tray 64 is set upon the ice 62 to chill or cool food contained within.

Although the invention has been described by reference to some embodiments it is not intended that the novel device be limited thereby, but that modifications thereof are intended to be included as falling within the broad scope and spirit of the foregoing disclosure, the following claims and the appended drawings.

We claim:

1. A portable chafer structure comprising: a chafer base including four sides and a bottom defining a generally rectangular-shaped structure having an interior chamber therewithin, the bottom being connected along a lower edge of each of the four sides to define a bottom tray adapted for holding and containing material spilled thereupon, the chafer base being sized for receiving a chafer rack within the interior chamber with sides of the chafer rack in immediate adjacency with corresponding sides of the four sides, the four sides of the chafer base extending vertically upwardly at a height at least the approximate height of the chafer rack, one of said four sides having an aperture sized to provide access to the interior chamber by a user.

2. The portable chafer structure of claim 1, wherein the chafer base is formed of a fire retardant material.

3. The portable chafer structure of claim 1, wherein the chafer base is formed of a molded high impact fire retardant plastic.

4. The portable chafer structure of claim 1, wherein at least two of the said four sides each has a ledge extending horizontally across an interior side thereof, each ledge having an upwardly facing horizontal surface, each ledge being in a spaced apart relationship below an upper edge of a corresponding side of said four sides.

5. The portable chafer structure of claim 1, wherein an interior side of each of the four sides has a ledge extending horizontally across, each ledge having an upwardly facing horizontal surface, the horizontal surfaces of each of the ledges lying within a common plane and forming a generally rectangular-shaped perimeter about the interior chamber.

6. The portable chafer structure of claim 5, further comprising a lower pan having peripheral flanges for supported engagement with the ledges to support the lower pan within the chafer base.

7. The portable chafer structure of claim 1, further comprising handle means provided on upper portions of opposite sides of the chafer base for allowing a user to carry the chafer base, the four sides being sloped downwardly inwardly allowing a plurality of chafer bases of similar construction to be stackable in nested relationship with one another.

8. The portable chafer structure of claim 1, wherein one of said four sides has an exterior surface portion sized and adapted for securement with a label containing indicia.

9. The portable chafer structure of claim 1, wherein the bottom has four corners, each corner having a downwardly extending portion, each downwardly extending portion forming a foot to support the chafer base on a surface.

10. The portable chafer structure of claim 9, wherein an interior side of each downwardly extending portion has a recess sized for receiving a leg of the chafer rack.

11. A fire retardant, portable chafer structure for use in combination with a chafer rack having a burner filled with combustible material for shielding the burner from wind and containing spilled combustible material, the chafer structure comprising: a chafer base including four sides and a bottom defining a generally rectangular-shaped structure having an interior chamber therewithin, the chafer base being formed of a fire retardant material, the bottom being connected along a lower edge of each of the four side to define a bottom tray adapted for holding and containing material spilled thereupon, the chafer base being sized for receiving a chafer rack within the interior chamber with sides of the chafer rack in immediate adjacency with corresponding sides of the four sides, the four sides of the chafer base extending vertically upwardly at a height at least the approximate height of the chafer rack, one of said four sides having an aperture sized to provide access to the interior chamber by a user.

12. The chafer structure of claim 11, wherein an interior side of each of the four sides has a ledge extending horizontally across, each ledge having an upwardly facing horizontal surface, the horizontal surfaces of each of the ledges lying within a common plane and forming a generally rectangular-shaped perimeter about the interior chamber, the perimeter being in a spaced apart relationship below upper edges of the chafer base.

13. The chafer structure of claim 12, further comprising a lower pan having peripheral flanges for supported engagement with the ledges to surface the lower pan within the chafer base.

14. The chafer structure of claim 12, further comprising handle means provided on upper portions of opposite sides of the chafer base for allowing a user to carry the chafer base, the four sides being sloped downwardly inwardly allowing a plurality of chafer bases of similar construction to be stackable in nested relationship with one another.

15. The chafer structure of claim 11, wherein the bottom has four corners, each corner having a downwardly extending portion, each downwardly extending portion forming a foot to support the chafer base on a surface, an interior side of each downwardly extending portion having a recess sized for receiving a leg of the chafer rack.

16. A fire retardant, portable chafer assembly for use in food service, the assembly comprising: a chafer base including four sides and a bottom defining a generally rectangular-shaped structure having an interior chamber therewithin, the chafer base being formed of a fire retardant material, the bottom being connected along a lower edge of each of the four sides to define a bottom tray adapted for holding and containing material spilled thereupon, a chafer rack adapted for holding a burner filled with combustible material, the chafer rack being in nested engagement within the interior chamber with sides of the chafer rack in immediate adjacency with corresponding sides of the four sides of the chafer base, the chafer rack having upper edges for supporting a lower pan, the four sides of the chafer base extending vertically upwardly with upper side edges of the chafer base adjacent with corresponding upper edges of the chafer rack, one of said four sides having means for providing access to the interior chamber by a user, and handle means provided on upper portions of opposite sides of the chafer base for allowing a user to carry the assembly.

17. The chafer assembly of claim 16, wherein an interior side of each of the four sides has a ledge extending horizontally across, each ledge having an upwardly facing horizontal surface, the horizontal surfaces of each of the ledges lying within a common plane and forming a generally rectangular-shaped perimeter about the interior chamber, the perimeter being in a spaced apart relationship below upper edges of the chafer base.

18. The chafer assembly of claim 17, wherein the chafer rack is selectably removable from the chafer base allowing peripheral flanges of the lower pan to be in supported engagement with the ledges to support the lower pan within the chafer base.

19. The chafer assembly of claim 18, wherein the bottom has four corners, each corner having a downwardly extending portion, each downwardly extending portion forming a foot to support the chafer base on a surface, an interior side of each downwardly extending portion having a recess for receiving a leg of the chafer rack.

20. The chafer assembly of claim 18, wherein the four sides are sloped downwardly inwardly allowing a plurality of chafer bases of similar construction to be stackable in nested relationship with one another.

\* \* \* \* \*